United States Patent

Kao

[11] Patent Number: 5,803,061
[45] Date of Patent: Sep. 8, 1998

[54] GAS-BURNED SOLDERING TOOL

[75] Inventor: Chin-Hsung Kao, Tu Cheng, Taiwan

[73] Assignee: Rekrow Industrial Inc., Taipei Hsien, Taiwan

[21] Appl. No.: 955,831

[22] Filed: Oct. 21, 1997

[51] Int. Cl.[6] .................................................. B23K 3/02
[52] U.S. Cl. ........................................... 126/414; 126/413
[58] Field of Search .................................... 126/403, 406, 126/413, 414, 237, 409, 236, 239, 235, 410; 431/344; 228/51

[56] References Cited

U.S. PATENT DOCUMENTS

| | | | |
|---|---|---|---|
| 4,552,124 | 11/1985 | Nakajima | 431/344 |
| 4,785,793 | 11/1988 | Oglesby et al. | 126/414 |
| 4,805,593 | 2/1989 | Hsu | 126/414 |
| 4,920,952 | 5/1990 | Nakajima | 126/414 |
| 4,966,128 | 10/1990 | Wang | 126/414 |
| 5,007,405 | 4/1991 | Hsu | 126/414 |

*Primary Examiner*—James C. Yeung
*Attorney, Agent, or Firm*—Bacon & Thomas

[57] ABSTRACT

A gas burned soldering tool provided with a swivel flame extinguisher controlled to extinguish open flame. The swivel flame extinguisher includes a fixed locating rod, a shaft, a control knob and a stopper respectively and perpendicularly extended from two opposite ends of the shaft, and a torsional spring mounted around the shaft, the control knob having a projecting rod, the torsional spring having one end connected to the projecting rod of the control knob and an opposite end fastened to the locating rod, the stopper being turned with the shaft by means of the control of the control knob between a first position where fuel gas is allowed to pass out of the gas nozzle and a second position wherein fuel gas is stopped from escaping out of the gas nozzle.

2 Claims, 6 Drawing Sheets

GAS-BURNED SOLDERING TOOL

BACKGROUND OF THE INVENTION

The present invention relates to a gas-burned soldering tool, and more particularly to a gas-burned soldering tool which uses a catalyzer for producing heat and transmitting its heat as a heat conducting medium to a soldering tip. In application, after a period of time in which the catalyzer is heated to a certain temperature so as to produce a thermal result, a swivel flame extinguisher is adapted to isolate the mix of butane gas spurted out from the soldering tool and the air for extinguishing the open flame. Later, the butane mixed gas is directly sprayed onto the catalyzer in order to proceed with so-called flameless burning.

A variety of gas-burned soldering tools have been developed in light of meeting soldering needs. These gas-burned soldering tools commonly adapt petroleum gas, for example butane gas, as fuel, and a catalyzer for producing heat and transmitting its heat to a soldering tip thereof.

FIG. 1 shows a conventional gas-burned soldering tool. This structure of gas-burned soldering tool is functional, however it still has drawbacks. In application of the conventional gas-burned soldering tools of this kind, an exterior flame is used to kindle the fuel gas spurted out therefrom. After the catalyzer deposed in interior of the soldering tool is heated, the user shall have to blow out the open flame with much effort, which needs to be improved. FIG. 2 shows another conventional gas-burned soldering tool according to U.S. Pat. No. 4,552,124. According to this structure of gas-burned soldering tool, a flame extinguisher is provided for extinguishing the open flame. The flame extinguisher comprises a barrel-like stopper mounted around the gas nozzle tube within the shell of the tool body, and a link having one end connected to the stopper and an opposite end extended out of the tool body. By pulling and pushing the link, the stopper is moved between the operative position to stop outside air from passing to the inside of the shell for mixing with fuel gas, and the non-operative position to let outside air passing to the inside of the shell for mixing with fuel gas. This structure of flame extinguisher cannot immediately extinguish the open flame when operated as well. Because there is a gap between the shell of the tool body and the stopper, air cannot absolutely stopped from passing to the inside of the shell when the stopper is moved to the operative position. Further, the precision requirement of the stopper complicates its manufacturing process and increases its manufacturing cost. FIG. 3 shows still another structure of conventional gas-burned soldering tool in which the flame extinguisher comprises a sleeve mounted around the gas nozzle tube and moved to stop air vents of the gas nozzle tube. This flame extinguisher arrangement still cannot eliminate the drawbacks of the aforesaid flame extinguishers.

SUMMARY OF THE INVENTION

It is one object of the present invention to provide a swivel flame extinguisher for a gas-burned soldering tool which positively and quickly extinguish the open flame when operated. It is another object of the present invention to provide an efficient flame extinguisher for a gas-burned soldering tool which requires less precision. It is still another object of the present invention to provide a gas-burned soldering tool which is easy and inexpensive to manufacture. According to one aspect of the present invention, the gas-burned soldering tool is provided with a swivel flame extinguisher. The flame extinguisher comprises a fixed locating rod, a shaft, a control knob and a stopper respectively and perpendicularly extended from two opposite ends of the shaft, and a torsional spring mounted around the shaft. The control knob has a projecting rod. The torsional spring has one end connected to the projecting rod of the control knob and an opposite end fastened to the locating rod. The stopper is turned with the shaft by means of the control of the control knob between a first position where fuel gas is allowed to pass out of the gas nozzle of the gas-burned soldering tool, and a second position wherein fuel gas is stopped from escaping out of the gas nozzle. According to another aspect of the present invention, the igniter of the gas-burned soldering tool has two electrodes respectively connected to a flame nozzle and a flame nozzle tube. The flame nozzle tube has a discharging electrode extended from its front end and fastened to a heat insulating element in front of the flame nozzle.

DETAILED DESCRIPTION OF THE PREFERRED EMBODIMENT

Figure 1:
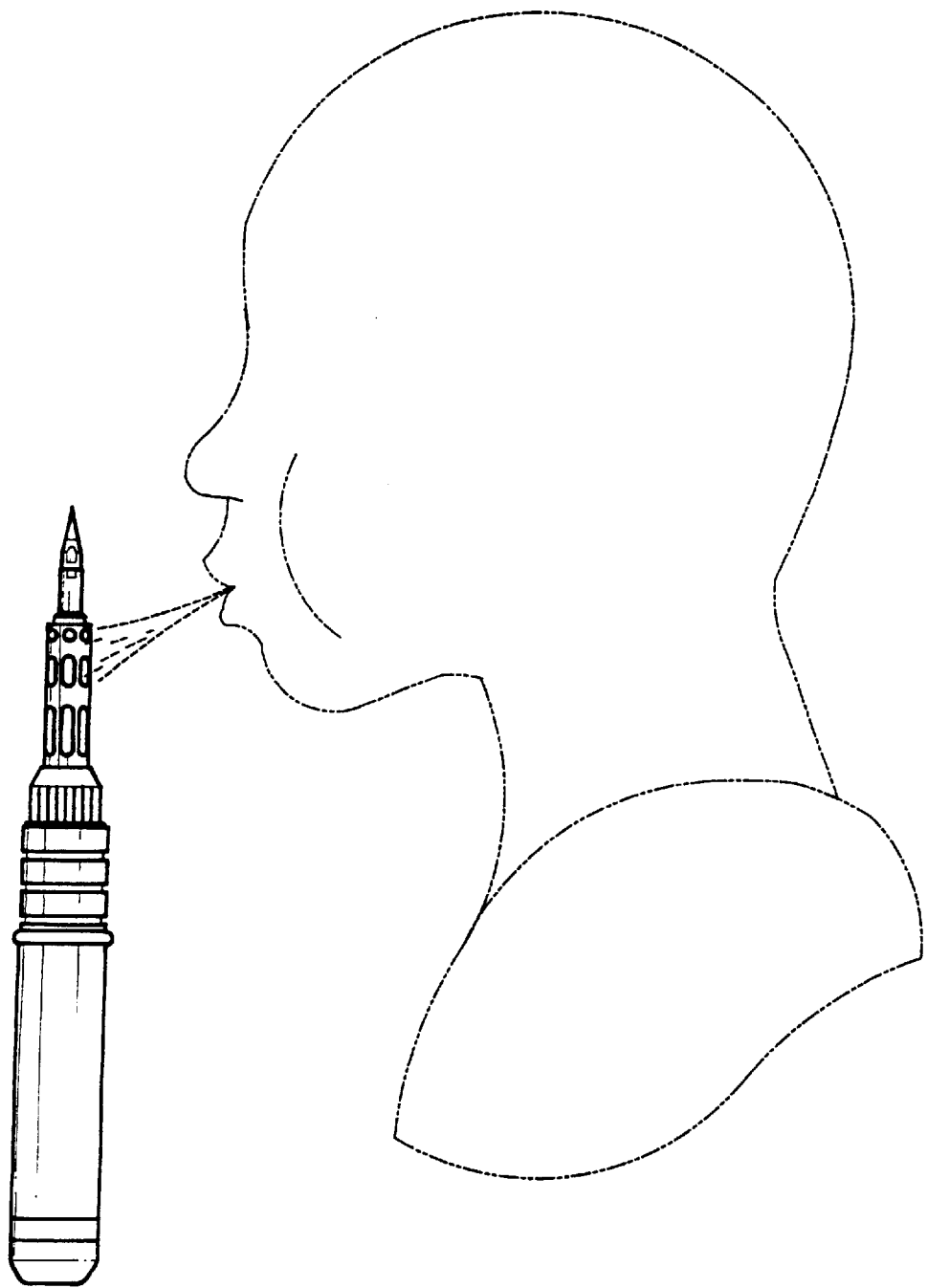
FIG. 1 shows the operation of a prior art gas burned soldering tool in extinguishing the flame.
Figure 2:
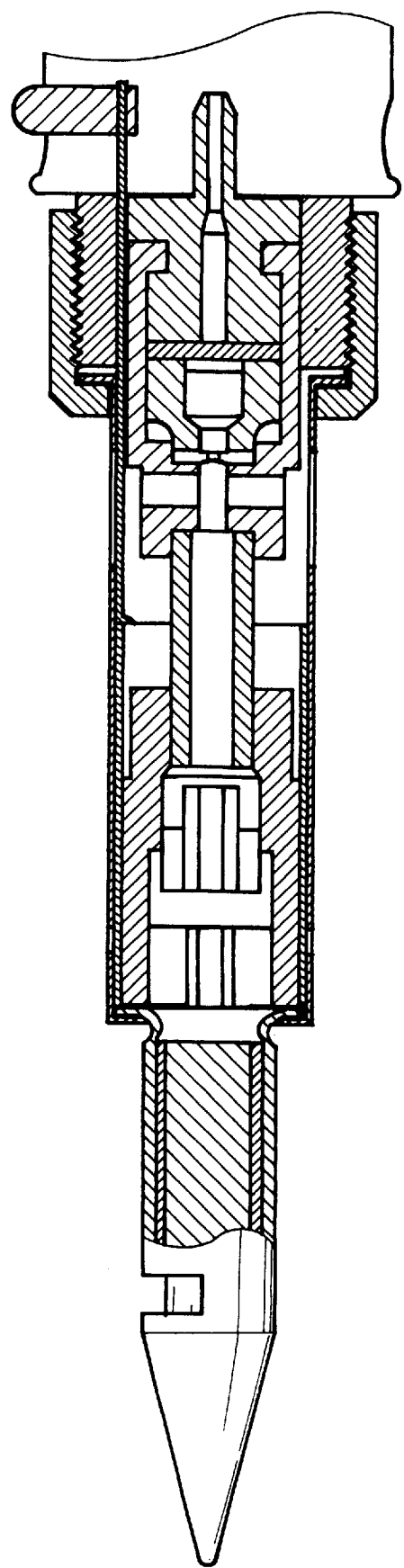
FIG. 2 is a sectional another structure of gas burned soldering tool according to the prior art.
Figure 3:
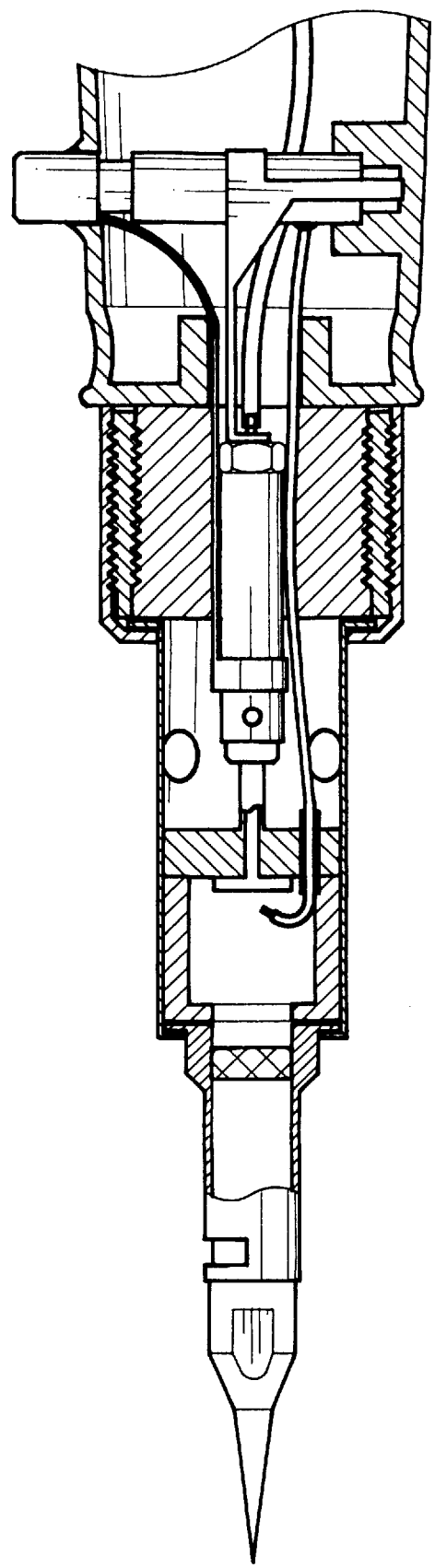
FIG. 3 is a sectional view of still another structure of gas burned soldering tool according to the prior art.
Figure 4:
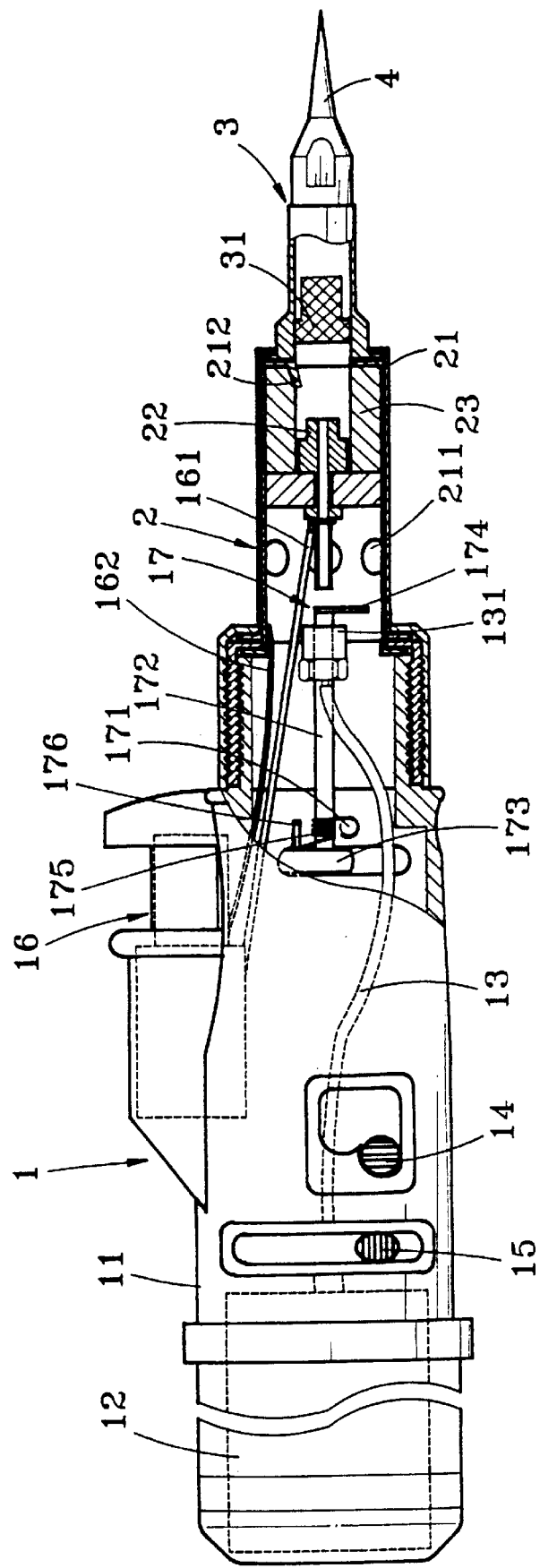
FIG. 4 is a sectional view of a gas burned soldering tool according to the present invention.
Figure 5:
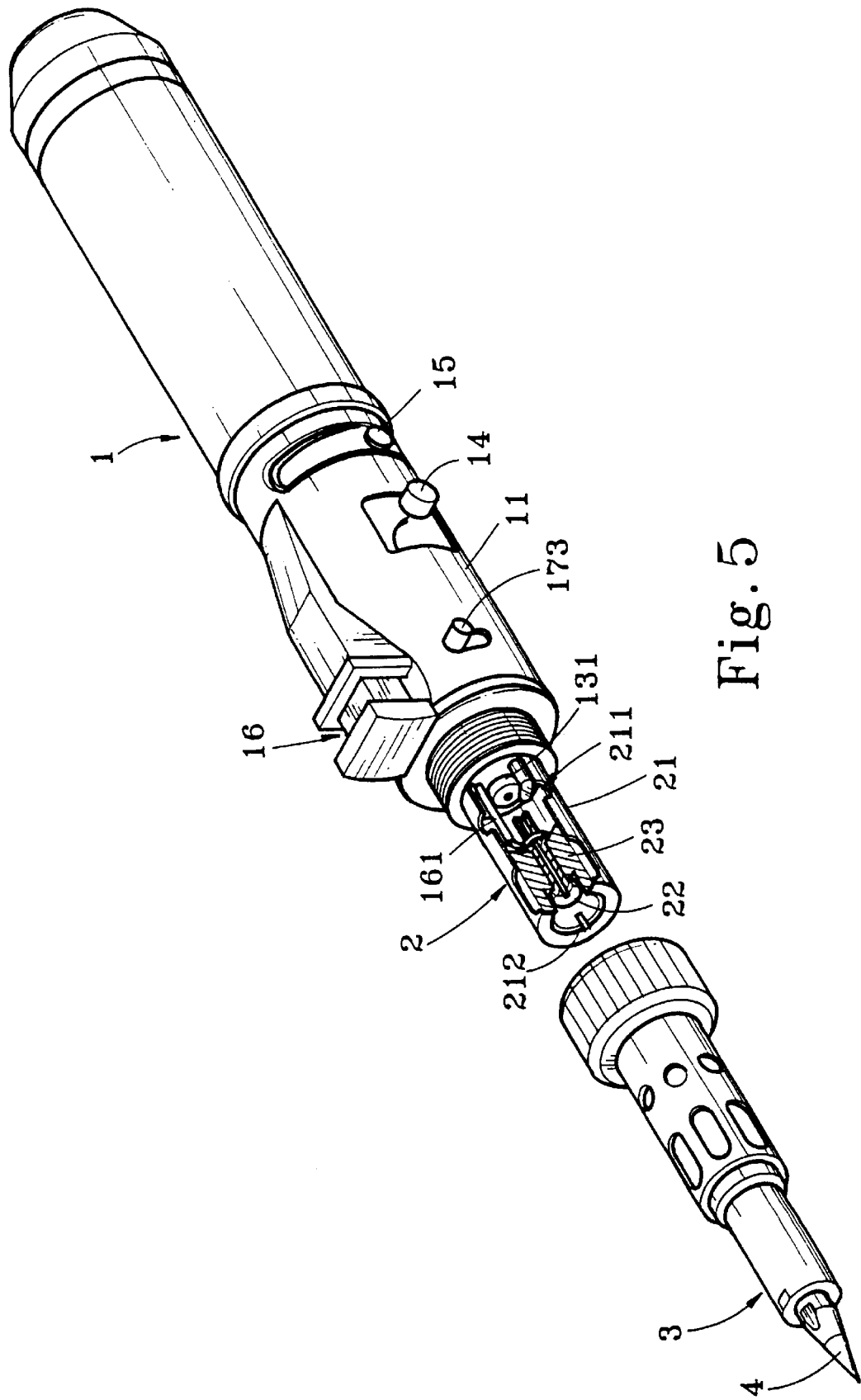
FIG. 5 is a cutaway view of the gas burned soldering tool shown in FIG. 4.

Referring to FIGS. 4 and 5, a gas-burned soldering tool is shown comprised of a tool body 1, a flame nozzle assembly 2 provided at a front end of the tool body 1, a forwardly extended and slotted soldering iron holder 3 mounted around the flame nozzle assembly 2 and holding a catalyzer 31 on the inside in front of the flame nozzle assembly 2, and a soldering bit 4 provided at a front end of the soldering iron holder 3 in front of the catalyzer 31. A shell 11 of the tool body 1 comprises a fuel chamber 12 holding a fuel gas, for example butane gas. A gas tube 13 is provided inside the tool body 1, having a rear end connected to the fuel chamber 12 and a front end terminating in a gas nozzle 131. A gas lever 14 is mounted in a hole of the shell 11 of the tool body 1, and adapted for controlling the fuel passage between the fuel chamber 12 and the gas tube 13. A flame adjustment knob 15 is provided for regulating fuel flow rate. An igniter 16 and a flame extinguisher 17 are provided for ignition control and fire extinguishing control respectively.

Referring to FIGS. 4 and 5 again, the flame nozzle assembly 2 comprises a metal flame nozzle tube 21 connected to the front end of the shell 11 of the tool body 1, a flame nozzle 22 mounted inside the flame nozzle tube 21 at its front end remote from the shell 11 of the tool body 1, and a heat insulating element 23, for example ceramic, mounted between the flame nozzle tube 21 and the flame nozzle 22. The flame nozzle tube 21 has a plurality of air vents 211. The flame nozzle 22 is axially aligned with the gas nozzle 131, and spaced from the gas nozzle 131 at a distance. The igniter 16 has two electrodes 161;162 respectively connected to the flame nozzle 22 and the flame nozzle tube 21. The flame nozzle tube 21 has a discharging electrode 212 extended from its front end and fastened to the inside of the heat insulating element 23 in front of the flame nozzle 22. When the igniter 16 is triggered, electricity is discharged through the flame nozzle 22 and the discharging electrode 212, thereby causing sparks to be produced in between the flame nozzle 22 and the discharging electrode 212 for burning fuel mixer discharged from the flame nozzle 22.

Figure 6:
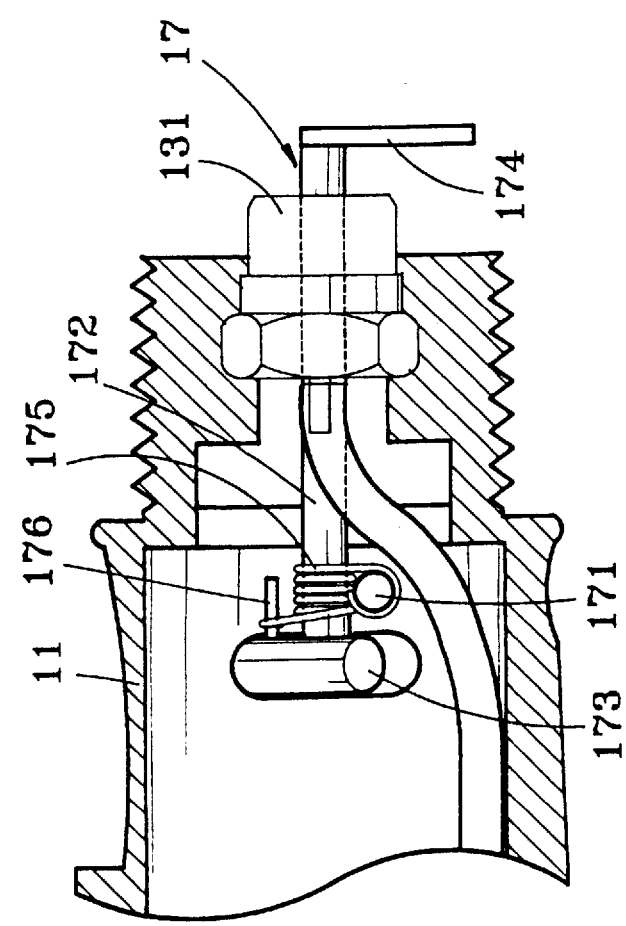
FIG. 6 is a sectional view in an enlarged scale of a part of the gas burned soldering tool shown in FIG. 5, showing the arrangement of the flame extinguisher in the shell of the tool body.

Referring to FIG. 6 and FIG. 4 again, the flame extinguisher 17 comprises a locating rod 171, a shaft 172, a control knob 173 and a stopper 174 respectively and perpendicularly extended from two opposite ends of the shaft 172, and a torsional spring 175 mounted around the shaft 172. The control knob 173 has a projecting rod 176. The torsional spring 175 has one end fastened to the projecting rod 176, and an opposite end fastened to the locating rod 171. The stopper 174 is spaced between the gas nozzle 131 and the flame nozzle 22.

Figure 7:
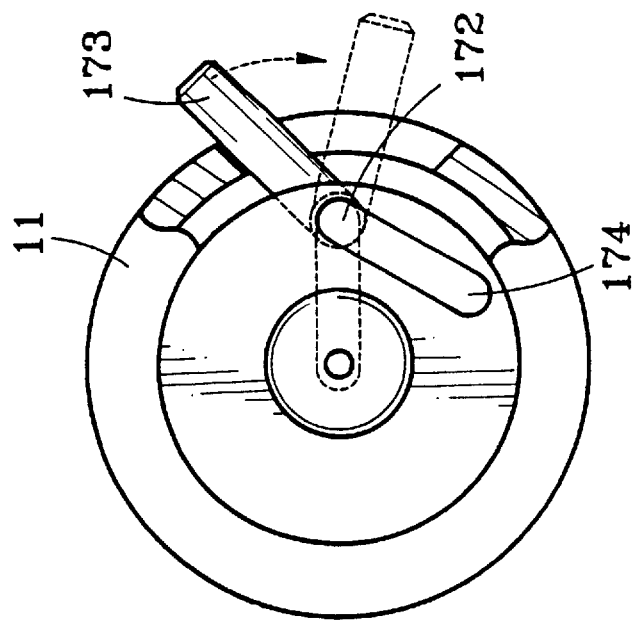
FIG. 7 shows the flame extinguisher operated according to the present invention.

Referring to FIG. 7 and FIG. 6 again, when the control knob 173 is operated, the shaft 172 is turned in one direction, the torsional spring 176 is compressed, and the stopper 174 is moved to the operative position to stop the gas nozzle 131. On the contrary, when the control knob 173 is released from the hand, the torsional spring 176 immediately returns to its former shape, thereby causing the shaft 172 and the stopper 174 to be turned to their former position.

After igniting, the catalyzer 31 is heated to a certain temperature so as to produce a thermal result. The swivel flame extinguisher 17 is then adapted to isolate the mix of butane gas spurted out from the soldering tool and the air for extinguishing the open flame. Later, the butane mixed gas is directly sprayed onto the catalyzer 31 in order to proceed with so-called flameless burning.

What is claimed is:

1. A gas burned soldering tool comprising:

a tool body, said tool body comprises a fuel gas chamber containing a fuel gas, a gas tube having a rear end connected to said fuel gas chamber and a front end terminating in a gas nozzle, a gas lever for controlling fuel gas passage between said fuel gas chamber and said gas tube, a flame adjustment knob for controlling the flow rate of fuel gas at said gas nozzle, an igniter controlled to cause sparks for burning fuel gas discharged from said gas nozzle, and a swivel flame extinguisher controlled to extinguish open flame, said flame extinguisher comprising a fixed locating rod, a shaft, a control knob and a stopper respectively and perpendicularly extended from two opposite ends of said shaft, and a torsional spring mounted around said shaft, said control knob having a projecting rod, said torsional spring having one end connected to said projecting rod of said control knob and an opposite end fastened to said locating rod, said stopper being turned with said shaft by means of the control of said control knob between a first position where fuel gas is allowed to pass out of said gas nozzle and a second position wherein fuel gas is stopped from escaping out of said gas nozzle;

a flame nozzle assembly fastened to a front end of said tool body in front of said gas nozzle, said flame nozzle assembly comprising a metal flame nozzle tube connected to said tool body and having a plurality of air vents, a flame nozzle mounted in said flame nozzle tube at one front end remote from said tool body, and a heat insulating element mounted within said flame nozzle tube around said flame nozzle, said flame nozzle being axially aligned with said gas nozzle and spaced from it at a distance;

a slotted soldering iron holder mounted around said flame nozzle assembly, said slotted soldering iron holder holding a catalyzer on the inside in front of said flame nozzle assembly; and a soldering bit provided at a front end of said soldering iron holder in front of said catalyzer.

2. The gas burned soldering tool of claim 1, wherein said igniter has two electrodes respectively connected to said flame nozzle and said flame nozzle tube; said flame nozzle tube has a discharging electrode extended from a front end thereof and fastened to said heat insulating element on the inside in front of said flame nozzle.

* * * * *